United States Patent
Schmidt

(10) Patent No.: US 8,225,940 B2
(45) Date of Patent: Jul. 24, 2012

(54) FILTER ELEMENT

(75) Inventor: Armin Schmidt, Saarbrücken (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 775 days.

(21) Appl. No.: 11/887,421

(22) PCT Filed: Mar. 4, 2006

(86) PCT No.: PCT/EP2006/002003
§ 371 (c)(1),
(2), (4) Date: Feb. 25, 2009

(87) PCT Pub. No.: WO2006/102966
PCT Pub. Date: Oct. 5, 2006

(65) Prior Publication Data
US 2009/0152190 A1   Jun. 18, 2009

(30) Foreign Application Priority Data
Mar. 30, 2005   (DE) .......................... 10 2005 014 360

(51) Int. Cl.
*B01D 29/21*   (2006.01)
*B01D 29/23*   (2006.01)
*B01D 29/58*   (2006.01)
*B01D 39/18*   (2006.01)
*B01D 39/16*   (2006.01)

(52) U.S. Cl. ..................... 210/493.5; 210/266; 210/282; 210/506

(58) Field of Classification Search ................ 210/493.5, 210/266, 282, 506
See application file for complete search history.

(56) References Cited

U.S. PATENT DOCUMENTS

| | | | | |
|---|---|---|---|---|
| 3,283,908 A | * | 11/1966 | Komarmy et al. | 210/266 |
| 3,552,553 A | * | 1/1971 | Reading | 210/484 |
| 4,619,948 A | * | 10/1986 | Kennedy et al. | 521/52 |
| 5,022,964 A | * | 6/1991 | Crane et al. | 162/146 |
| 5,022,997 A | * | 6/1991 | Salem et al. | 210/670 |
| 5,284,704 A | * | 2/1994 | Kochesky et al. | 442/364 |

FOREIGN PATENT DOCUMENTS

| | | | |
|---|---|---|---|
| DE | 1 083 466 | | 6/1960 |
| DE | 1083466 B | * | 6/1960 |
| DE | 27 15 204 | | 10/1977 |
| FR | 1 356 098 | | 3/1964 |
| JP | 10113507 | | 5/1998 |
| WO | WO 01/21279 | | 3/2001 |
| WO | WO 01/85301 | | 11/2001 |

OTHER PUBLICATIONS

Ussieve—U.S. Standard Sieve Series, accessed at http://www.wirecloth.com/howto/convert/ussieve.html, Apr. 24, 2011.*

* cited by examiner

*Primary Examiner* — Nam Nguyen
*Assistant Examiner* — Denise R Anderson
(74) *Attorney, Agent, or Firm* — Roylance, Abrams, Berdo & Goodman, L.L.P.

(57) ABSTRACT

A filter element includes a filter material (10) having individual filter folds (12) folded in a star-like manner. At least one fluid-permeable support element (26) extends at least partially in the space between two adjacent filter folds (12) and/or on the inner peripheral side and/or external peripheral side of the filter folds (12). The support element (26) is provided with filter-active substances or is made of filter-active substances. A certain type of filter auxiliary agent can be obtained which is used to reduce influences of fluid components which reduce the service life, in the form of specific ageing products or in the form of other agents which damage the fluid.

10 Claims, 2 Drawing Sheets

FILTER ELEMENT

FIELD OF THE INVENTION

The invention relates to a filter element with a filter material having individual filter folds folded in a star shape. At least one fluid-permeable support extends at least partially into the space of two adjacent filter folds and/or on the inner peripheral side and/or the outer peripheral side to the filter folds.

BACKGROUND OF THE INVENTION

Filter elements such as these are readily available on the market in a plurality of embodiments. These filter elements are used when inserted in the filter housing to clean the supplied dirty fluid, for example in the form of a hydraulic medium, by using the filter material of the filter element, and to return the fluid cleaned in this way from the filter housing to the fluid circuit, in particular the hydraulic circuit. If after a plurality of filter cycles the filter material is clogged with dirt such that it is used up, the filter element is removed from the housing and is replaced by a new one. To increase the filtering surface, modern filter elements have a filter mat web folded in a star shape and surrounding an inner or outer support tube in a concentric circle, against which the filter material with its filter folds folded up in a star shape can be supported. Especially when flow takes place through the filter element from the outside to the inside, can the filter folds be supported on the support tube during filtration. The filtration direction can be reversed, that is, from the inside to the outside. Furthermore, backflushing processes with already cleaned fluid are also conceivable to clean the filter material clogged by dirt. The filter material itself has a multilayer mat structure, the layer structure being dependent on the filtration task to be performed. Generally, layer structures are used with clean filtering and draining layers, composed of native fibers, plastic fibers, such as meltblown fibers, glass fibers, and the like. To ensure a fixed association of layers against one another, the two cover layers of the filter material can be a fine-mesh wire fabric seeking to prevent washout of the fiber material.

The disadvantage of filter materials folded in a star shape is that the individual filter folds can be deformed during filtration and come to rest on one another, forming a block. This deformation reduces the surface effective for filtration and consequently degrades filter performance. These faults occur especially in fluids with high viscosity, as generally occur for example in a cold start of a fluid system or hydraulic system. Blockage of the folds causes a degradation of drainage and ultimately leads to increased pressure losses at a reduced dirt holding capacity and a reduced service life for the filter element.

To help avoid unwanted deformation of the folds and formation of fold blocks, the prior art (WO 01/85301 A1) has already suggested surrounding the concentrically arranged filter material with its filter folds on the outer peripheral side with a support. The support is a type of hollow cylinder with its outer periphery on the inner periphery of the outer housing part of the filter element. On the inner peripheral side, the support forms individual projections engaging the spaces between adjacent filter folds to prevent them from coming to rest on one another in an undesirable manner or even from being folded over. Since in the known solution the fluid-permeable support is formed from a type of porous sponge (available under the trademark "SIF" from Foamex International Inc., 10000 Columbia Avenue, Linwood, Pa. 19061), it has high inherent elasticity. With a certain pretensioning, the adjacent filter folds are then kept at a distance from each other and can engage the depressions of the otherwise cylindrical foam support.

With the known solution, very good supporting effects can be achieved and failure of the filter element, even at higher fluid viscosities, as occur in cold starts, is precluded in this way. In addition to increasing the operating reliability, the known solution can also be economically implemented.

This known solution has been found to be still susceptible to blockage. This blockage is caused by ageing products in the fluid which can lead to the entire filter element becoming choked and unusable. Thus, among other things, the types of oil used in wind power plants are characterized by a high content of additives to be able to form very good tribologic properties. The disadvantage is that in the aged state of the oil the additives occur as ageing products or oil residues which are not oil-soluble and which then cement the surface of the filter material. In this respect, the filter element can then only make available a part of the actual dirt holding capacity in filtration. This situation in turn leads to increased pressure losses and to reduced service life of the optimized filter element with support means.

SUMMARY OF THE INVENTION

An object of the invention is improved support for a filter element while retaining its advantages, such that possible blockage of the filter element by ageing products (choking) is prevented.

This object is basically achieved by a filter element having a support provided with filter-active substances or is itself composed of these filter-active substances. A kind of filtering aid can then be obtained to reduce the effect of fluid components which reduces the service life, whether in the form of specific ageing products, or in the form of other media which damage the fluid, such as acid portions or the like. Depending on the selected filter-active substances, microorganisms can be kept away from the fluid flow. Preferably the filter-active substances used are those which can offer a high specific surface to obtain good bonding of the substances and particles which damage the fluid.

The filter-active substances are used as a type of particle scavenger and can prevent migration of the damaging substances to the clean side of the filter element, for example, in bonding with a foam-like body as the support keeping the filter folds in position. Thus, for example, by settling of the oil ageing products on the particle scavengers which act as sludge catchers, the filter material of the filter element can be relieved and can then again perform its actual task of separating the solids from the fluids. Use of the filter-active substances as particle scavengers on the clean side of the filter is less recommended due to lower efficiency. In coaxial solutions where one filter element is located concentrically to the other filter element in it or adjacent to it, an intermediate layer of filter-active substances can be advisable which then must lie on the clean side of the filter element which precedes it in the fluid direction. In filter elements through which flow takes place from the inside to the outside preferably for filtration, the support with the filter-active substances then should be located on the inside of the filter element, that is, in turn in the inflow direction in front of the actual filter material.

Preferably the support for the purpose of doping is provided with filter-active substances. The filter-active substances themselves can also form the support as a whole or for the most part. For example, when in the form of charging with pourable filter-active substance, the individual distances between the filter folds are filled. Preferably, charging must take place such that on the dirty side of the filter element the filter folds experience support.

In one preferred embodiment of the filter element according to the invention, the support has a porous, especially sponge-like basic structure. In the pores of that structure, at least to some extent the filter-active substances, such as bentonite, perlite, activated charcoal, kieselguhr, are enclosed. The basic structure can also be composed of dual-component fibers. Depending on the filter-active substances used as the filtering aids, deep-bed filter or even membrane filter properties can be achieved in this way.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure and which are schematic and not to scale.

DETAILED DESCRIPTION OF THE INVENTION

Figure 1:
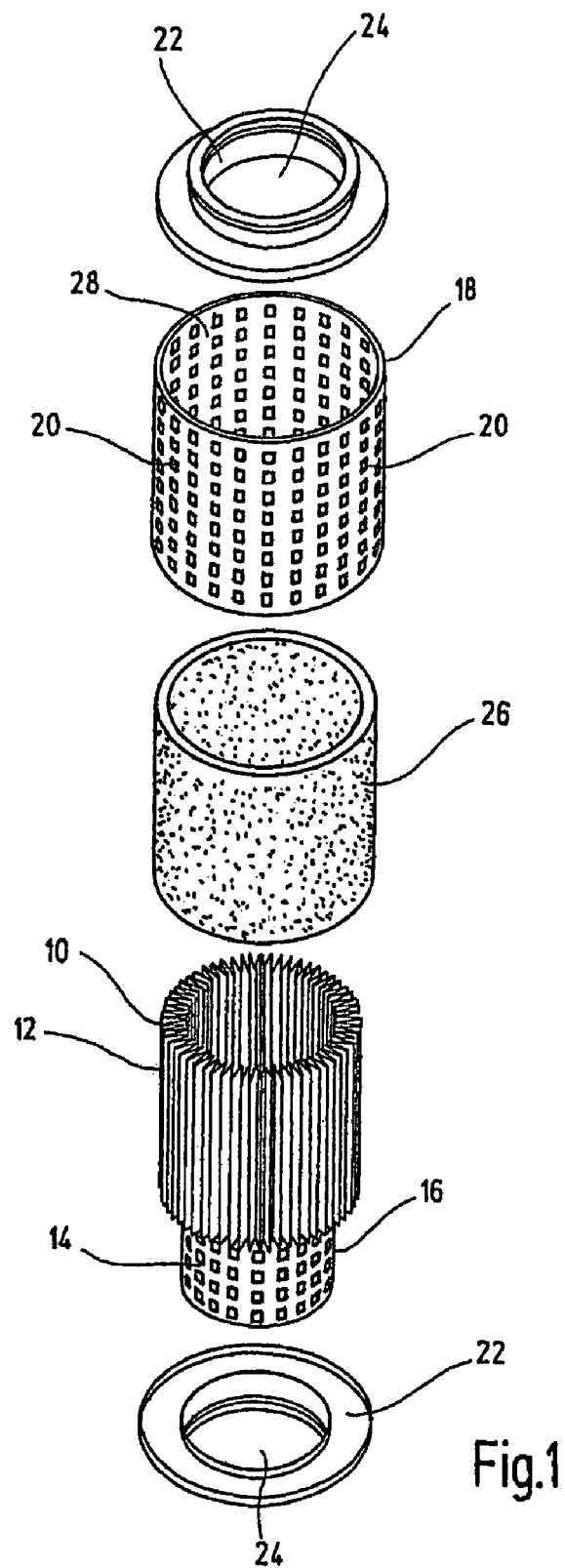
FIG. 1 is an exploded perspective view of a filter element according to an exemplary embodiment of the invention.

The filter element shown in FIG. 1 has filter material 10 folded in a star shape as a pleated filter mat and having individual filter folds 12. The filter material 10 folded in this way forms a hollow cylinder. Especially, the mat structure for the filter material 10 has multiple layers (not shown) with supporting drainage layers located on the outside layer and filtering main filter layers located in between. The interconnected layers can be supported both to the outside and to the inside by wire cloth. This filter material structure of native fibers, plastic fibers such as meltblown fibers or the like, is conventional so that it will not be detailed here. The inside of the filter material 10 is supported by an inner support tube 14 provided with perforation sites 16. To the outside or on the outer peripheral side, the filter material 10 is surrounded by an outer support tube 18 with perforation sites 20. This outer support tube 18 can also be made as a thin-walled, outer housing jacket, for example in the form of a fluid permeable metal screen structure (not shown). Viewed in the direction of FIG. 1 to the top and bottom, the filter material 10 is bordered by two end caps 22. End caps 22 in the center have recesses 24 for possible fluid passage. Between the raised edges of the end caps 22, the two support tubes 14, 18 and the filter material 10 can be inserted adhesively on the end side so that a filter element made in one piece as a replacement part for a filter housing (not detailed) is formed to be used in a fluid system, especially a hydraulic system.

Furthermore, a fluid-permeable, cylindrical support 26 is located between the inner peripheral side 28 of the element housing 18 and the outer periphery along the outside of the filter folds 12. This arrangement in the assembled state of the filter element as shown in FIG. 1 is reproduced in FIG. 2. In the illustrated embodiment, the support 26 is formed from a porous, especially spongy base structure as the base matrix. Due to the inherent elasticity of the base structure, the outer filter folds 12 engage the foam material, and the convexly protruding projections 30 of the support 26 engage the existing spaces between the adjacent filter folds 12 of the filter material 10. As a result of these projections 30, the filter folds 12 supported on the inner peripheral side on the inner support tube 12 are held in position. Even for very highly viscous, waxy fluids, as a result of the support the filter folds 12 cannot be moved in their location such that they bend or stick to one another to form blocks. This movement otherwise leads to a reduction of the dirt holding capacity with the above described disadvantage.

In spite of these measures which are disclosed in the prior art (WO 01/85301 A1), the filter element can become unusable, in particular the filter can be blocked, if for example ageing products as a type of choking settle between the filter folds 12 on the filter material 10. In particular, in wind power plants, hydraulic media and types of oil are used which due to the high stress on them in this field have a high content of additives. In the aged state of the fluid medium then oil-insoluble ageing products or oil residues occur which cement the surface of the filter element so that the filter element can again reach only a fraction of its actual dirt holding capacity at all. This residue reduces the service life of the filter element and, as a result of blockage, a correspondingly high pressure loss occurs with the consequence that the filter elements must be changed at very short maintenance intervals in order not to endanger the operation of the overall hydraulic system. Regardless or in addition, of course the fluid can be further burdened, for example can have highly acid-containing components, can contain special abrasive media or entrain even microorganisms which can damage highly sensitive mechanical parts and the quality of the fluid.

Because the support 26 is provided with filter-active substances or even is built up from these filter-active substances, in this way "particle scavengers" enclosed in the region of the filter material 10 of the filter element can be created. Depending on the specification, the filter-active substances can remove fluid- or component-damaging components from the fluid flow. Thus, for example it is possible to sort out the ageing products which can lead to choking of the filter element by the filter-active substances as particle scavengers. Even before the ageing products can reach the sensitive filter material 10, those products can be sorted out so that in this way the oil-insoluble ageing products or oil residues can be retained in the manner of prefiltration or pretreatment. To achieve this effect, the support 26 with the working filter-active substances should be located on the dirty side, and as a preferred option a fluid flow space 32 should remain between the exit wall of the support 26 and the entry wall for the respective filter fold 12 to achieve undisturbed flow while avoiding cavitation.

If the support 26 is formed of a porous, especially sponge-like base structure as the matrix, at least in part filter-active substances, such as bentonite, perlite, activated charcoal, kieselguhr or the like can be enclosed in its pores. It has been proven to be especially advantageous to build up the base structure itself from dual-component fibers. In this way, for the purpose of doping the possibility exists of acting on the basic structure of the support 26. The filter-active substances form a type of filtering aid. In this way, the body geometries have a high specific surface. This arrangement enables a particle retention capacity to an increased degree. By corresponding mixtures of filter-active substances, potential oil-insoluble ageing products as well as acid portions of fluids or microorganisms could be retained via the activated charcoal portions of the filter aid mixture and could be removed from the fluid flow.

To the extent the support 26 is built up from dual-component fiber systems, preferably a polyolefin fiber core with a high melting point (for example a polypropylene core) is selected which is concentrically surrounded by a fiber jacket of polyolefin material with a low melting point (for example in the form of a polyethylene jacket). This structure has the advantage that in the production of the matrix under temperature the outer jackets of the fibers melt quickly and are joined to one another without the fiber cores being adversely affected in their stability. In this way, a fine-mesh matrix structure is then obtained which is intended for doping with the filter-active substances. For certain retention tasks it can then also be sufficient to form only one base structure as the support 26 from dual-component fibers without doping with filtering aids. To form the support 26 for purposes of a deep-bed filtration solution, it has the form of a matrix of self-binding plastic and/or natural fibers (cellulose) at least partially fibrillated. A finely fibrillated fiber substance, especially ground cellulose, is introduced into the support 26 itself. For this purpose the support skeleton and the inert particles in the form of agglomerate particles with a defined size between 0.5 to 100 μm, especially in the form of a finely dispersed kieselguhr, can improve filter properties.

Figure 2:
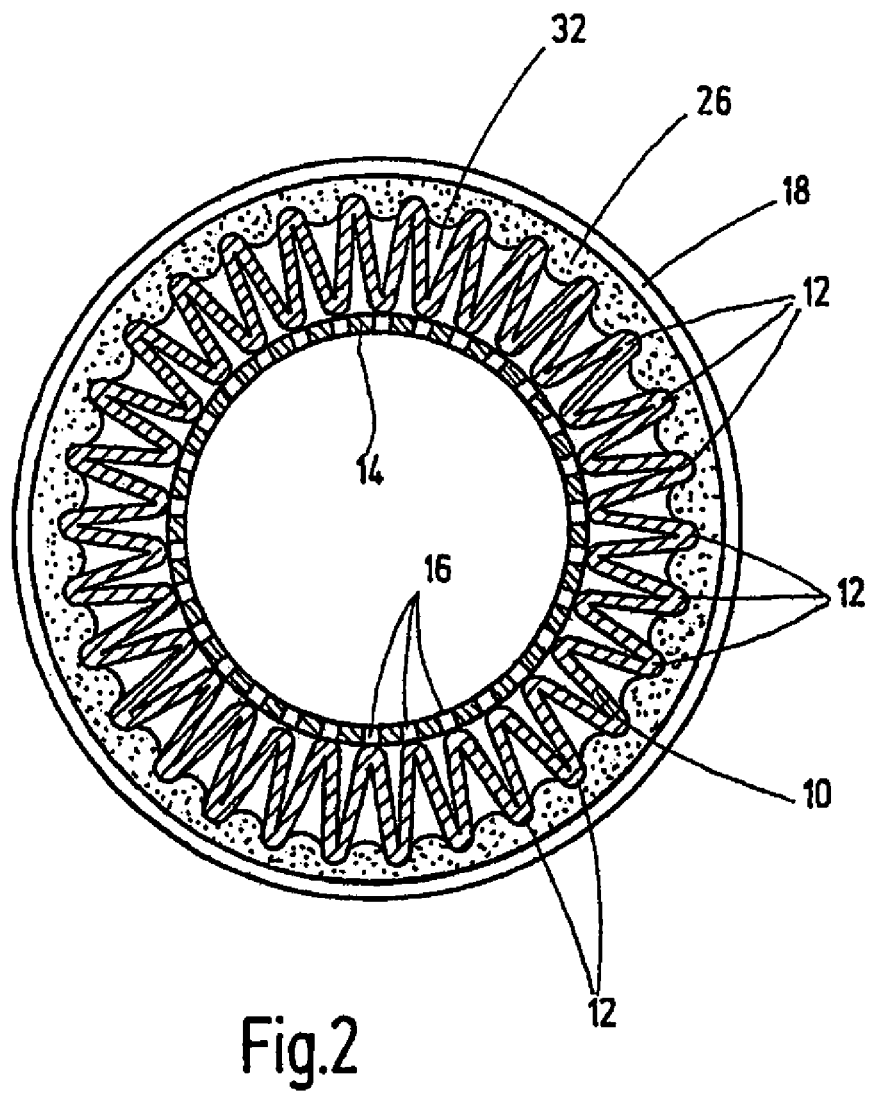
FIG. 2 is a plan view in section of the filter element of FIG. 1 in the assembled state along one center plane.

In the solution shown in FIG. 2, the support 26 surrounds the outer sides of the filter folds 12. For the purposes of further optimization of the solution according to the invention, it would now be possible to introduce another filter-active substance into the fluid flow space 32, for example, in the form of activated charcoal which can be easily fed into the fluid flow space 32. In this way, with the spongy base structure located on the outer peripheral side, oil ageing residues could be retained. By means of activated charcoal microorganisms or the like, oil ageing residues could be filtered out of the fluid flow. Depending on the desired specification, mixtures of bentonite, perlites, activated charcoal and kieselguhr could also fill the intermediate spaces as pourable media between the filter folds 12 and on the clean side of the filter. In a concentric arrangement, these filter-active substances could be placed as a hollow cylinder in intermediate spaces, which are not detailed, between the inner support tube 14 and the inner filter folds 12 or even to replace the inner support tube 14 with this hollow cylinder. The support 26 shown in FIGS. 1 and 2 in the form of a base material can also be completely omitted. The filter-active substances are then, as shown, moved by pouring into the spaces between the filter folds 12, especially on their dirty side. This arrangement can result in solutions which are especially geometrically small, since then the outer support tube 18 or housing part can be supported with its perforation sites 20 directly on the outer periphery with the filter folds 12 of the filter material 10.

While one embodiment has been chosen to illustrate the invention, it will be understood by those skilled in the art that various changes and modifications can be made therein without departing from the scope of the invention as defined in the appended claims.

What is claimed is:

1. A filter element, comprising:
a filter material having individual filter folds arranged in a star shape;
at least one fluid-permeable support having a porous base structure with pores and extending at least partially into spaces between adjacent filter folds, said support extending at least on one of an inner peripheral side of said filter material and on an outer peripheral side of said filter material, said base structure being formed of at least one of dual-component fibers and of a poured filter-active substance bed, said base structure forming a matrix of at least one of self-binding plastic fibers and natural fibers being at least partially fibrillated;
filter-active substances being one of provided with said support and forming said support, at least to some extent said filter-active substances being enclosed in said pores; and
at least one of a finely fibrillated fiber and inert particles forming agglomerates of particles with a defined size of 0.5 to 100 μm in said matrix.

2. A filter element according to claim 1 wherein
said base structure is sponge like; and
said filter-active substances are in said pores and are selected from the group consisting of bentonite, perlite, activated charcoal and kieselguhr.

3. A filter element according to claim 1 wherein
said base structure is formed of dual component fibers.

4. A filter element according to claim 1 wherein
said base structure is formed of a poured bed of activated charcoal.

5. A filter element according to claim 1 wherein
said individual filter folds are encompassed by said base structure on one of said inner and outer peripheral sides of said filter material; and
said base structure extends radially into spaces between said individual filter folds by projections thereof.

6. A filter element according to claim 1 wherein
said base structure surrounds said filter material on at least one of said inner peripheral side and said outer peripheral side.

7. A filter element according to claim 1 wherein
said filter material forms a hollow cylinder supported on said inner peripheral side thereof and to an outside on a hollow cylindrical perforated housing part, said base structure being a hollow cylinder and located between said housing part and said outer peripheral side of said filter material.

8. A filter element according to claim 1 wherein
said filter material and said base structure extend between two end caps.

9. A filter element according to claim 1 wherein
said support comprises the matrix of self-binding at least one of plastic fibers and natural fibers at least partially fibrillated.

10. A filter element according to claim 1 wherein
said base structure is formed of dual component fibers having a core of polypropylene and a jacket of polyethylene.

* * * * *